No. 775,948. PATENTED NOV. 29, 1904.
A. H. STEBBINS.
ORE WASHER.
APPLICATION FILED OCT. 30, 1902.
NO MODEL.

Witnesses:
D. W. Edelin.
A. Harveycutter.

Inventor:
Albert H. Stebbins.
By Rob P. Hains.
Atty

No. 775,948. Patented November 29, 1904.

UNITED STATES PATENT OFFICE.

ALBERT H. STEBBINS, OF LITTLE ROCK, ARKANSAS.

ORE-WASHER.

SPECIFICATION forming part of Letters Patent No. 775,948, dated November 29, 1904.

Application filed October 30, 1902. Serial No. 129,403. (No model.)

*To all whom it may concern:*

Be it known that I, ALBERT H. STEBBINS, a citizen of the United States, residing at Little Rock, county of Pulaski, and State of Arkansas, have invented certain new and useful Improvements in Ore-Washers, of which the following is a specification, reference being had to the accompanying drawings, forming a part thereof.

The invention to be hereinafter described relates to ore-washers for extracting and collecting the valuable particles from the large amount of waste material with which they may be mixed, and in the present embodiment of my invention I have shown and described what I term a "dry" washer—that is, an apparatus in which air or other fluid is employed in connection with mechanical devices to separate the light and waste material and expel it from the apparatus, leaving behind the values, which may be collected for further use.

It is well known that ground or pulped ore or other material containing valuable minerals is composed of particles differing in specific gravities and that if such material be subjected to the action of air or like fluid in a manner to agitate the mass the heavy or valuable particles will gravitate to the bottom of the mass, while the lighter or waste particles will be found near the top. I have taken advantage of this fact and have devised means whereby air or other fluid currents are caused to pass through comminuted material to cause a stratification thereof according to the specific gravities of the particles and simultaneously therewith to remove the top strata of light or waste material, leaving the heavy or valuable particles to be collected as desired, all as will be hereinafter described, and pointed out in the claims.

Figure 1:
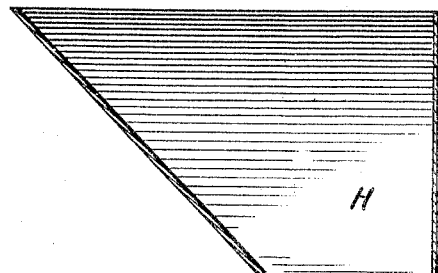
Figure 2:
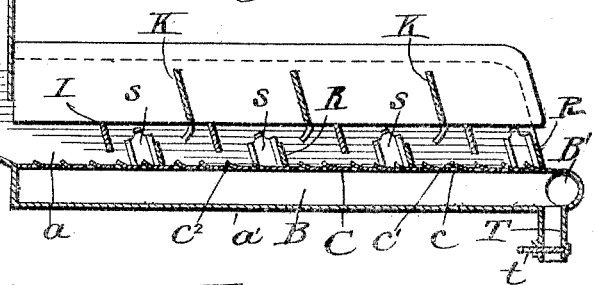
Figure 4:
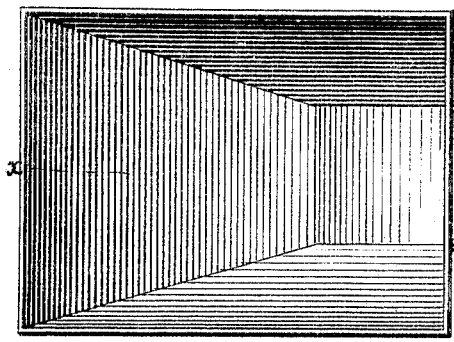
Figure 4:
Figure 3:
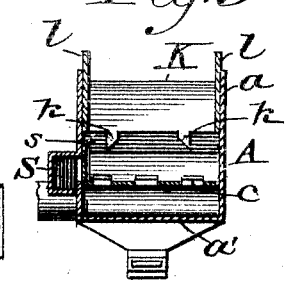

In the drawings, Figure 1 is a central longitudinal section of the machine embodying my invention, taken on the line $xx$ of Fig. 2. Fig. 2 is a plan view of the machine. Fig. 3 is a cross-section thereof on the line $yy$ of Fig. 2, looking in the direction of the arrow $z$. Fig. 4 is a perspective view of a detail detached from the machine and embodying the regulating-bars to be described, and Fig. 5 is a detached detail view of a modification of the regulating-bars and screen connections to be described.

The machine illustrated in the drawings is designed as a dry washer—that is, a machine designed to extract a small amount of values from a large amount of waste material by the combined action of air or like currents and mechanical means, and in the present embodiment of my invention comprises a box-like frame, (designated as a whole by the reference-letter A,) said frame in the present form of my invention being elongated in the general condition of a trough and comprising side pieces $a$, connected by the bottom $a'$, above which and dividing the box-like frame to form the air-chamber B is the concentrating-surface C, said surface being provided with perforations $c$, formed by forcing upward a portion of the material of said surface to produce an offset $c'$, the said opening through the concentrating-surface C being directed preferably lengthwise of the machine, as shown, and toward the feed end thereof, whereby the air or other fluid currents forced through said perforations $c$ in the concentrating-surface will be directed along and over said surface toward the feed end of the machine. At the feed end the machine is provided with a feed-hopper H, into which material to be treated may be placed. At the opposite or discharge end of the machine and in communication with the fluid-chamber B is an air or fluid inlet B', by which suitable blasts of air or other fluid may be introduced into the fluid-chamber and be directed from the discharge end of the machine toward the feed end. It will thus be seen that the fluid-inlet directs the initial blasts of air or fluid as they enter the fluid-chamber in the direction of the feed end of the machine and that the perforations $c$ in the concentrating-surface C also act to continue this direction of movement of the air or fluid currents.

Secured to the sides $a$ of the box-like frame A and extending between the same with their lower edges resting upon the concentrating-surface C are the riffles R, against which the heavy material, such as the values or concentrates, will lodge as the mass of material travels from the hopper toward the outlet end of the machine, as will hereinafter more fully appear.

These riffles may of course be of various shapes and be varied in number; but in the present embodiment of my invention I have shown four of such riffles which are inclined slightly to the concentrating-surface C; but other dispositions of these riffles may sometimes be desirable. Likewise secured to the sides $a$ of the frame A are the impedimental bars I, extending between the sides of the said frame and disposed with their lower edges some distance above the concentrating-surface. These impedimental bars are located one preferably in front of or adjacent to each of the riffles R, and the lower edge thereof may, if desired, extend slightly below the top edge of the adjacent riffle, although this is not essential, as other relations may exist between the lower edges of the impedimental bars and the top edges of the riffles, the said impedimental bars being intended to partially obstruct the flow of the material as it passes from the hopper toward the discharge end of the machine. Like the riffles, the impedimental bars I are inclined, preferably, toward the concentrating-surface C, so that material passing from the hopper to the discharge end of the machine will be directed by the front face of the impedimental bars downward toward the concentrating-surface, where it is subjected to the force of the currents of air or other fluid passing through the perforations $c$ of said surface.

Extending transversely between the sides $a$ of the frame A is a third set of bars, which I will designate as the "regulating-bars K," said bars being disposed above the riffles and impedimental bars and inclined, preferably, parallel to the inclination of the said bars. The office of these regulating-bars is to control or regulate the amount of material—such as gravel, sand, or pulp—which may travel down the machine from the feed-hopper to the discharge end, the said regulating-bars serving to prevent such material from traveling through the machine without being subjected to the action of the air or fluid currents and the riffles and impedimental bars, since in order to pass the said regulating-bars K the material is caused to go beneath the same. In some cases I have found it desirable to provide the regulating-bars with a series of teeth $k$, extending downward from the lower edge of said bars to further impede and obstruct the free travel of the material from the hopper toward the feed end of the machine.

While it is generally desirable to use the regulating-bars K or some equivalent means for preventing too rapid movement of the material from the hopper to the discharge end of the machine without proper treatment for the extraction of the values or concentrates, I have preferably mounted said regulating-bars in a removable frame L, comprising the side frames $l\ l$, which fit between the side frames $a\ a$ of the box-like frame A, the said removable frame and regulating-bars being best shown detached in Fig. 4 and in position between the side pieces $a$ of the frame by the cross-section of Fig. 3 and in plan in Fig. 2.

In the treatment of some characters of material, especially where the component particles, such as gravel and the like, are comparatively large, it is desirable that such large and waste material shall be eliminated from the machine without passing into the action of the impedimental bars, riffles, and fluid-currents, and I have therefore devised another form of regulating device from that shown in Fig. 4, which when the regulating device L of Fig. 4 is removed from the machine may be substituted therefor to accomplish the results stated. This modified form of regulating device comprises suitable side frames $m$, adapted to fit between the side frames $a\ a$ of the box-like frame A, and the lower edges of said side frames $m$ are connected by a screen $m'$, the side frames being themselves further connected by obstructing-bars, such as O, extending between the side frames, with their lower edges in contact with the upper surface of the screen $m'$. Above the screen $m'$ and intermediate the obstructing-boards O are other regulating-bars P, the disposition and construction of which will be clearly apparent from Fig. 5. In order that no material shall pass to the concentrating-surface before first passing through the screen $m'$, I have provided the end of the modified form of regulating device of Fig. 5 with the reduced end $p$, which when the said device is forced to position between the side pieces $a$ of the frame A extend into the lower portion of the hopper, so that material from the hopper before passing onto the concentrating-surface must first pass onto the screen $m'$, as will be evident. The devices illustrated by Figs. 4 and 5 I will term "regulating" devices, since they control or regulate the material as it passes from the hopper toward the feed end of the machine.

It is advantageous in many instances to clean the concentrates or values from the concentrating-surface frequently, and a ready means for doing so becomes desirable. Therefore down one side of the machine is preferably placed a concentrate chute or pipe S, into which from above each riffle the concentrates may be discharged by brushing them through a suitable opening in the walls or side pieces $a$ of the frame A, the said openings being normally closed by means of suitable doors or slides $s$. In order to clean the concentrates from the concentrating-surface in this manner, it is only necessary to raise the doors $s$ and brush the concentrates or values into the chute or pipe S, from which they may be readily collected, as desired.

It will be obvious that in machines of this character, where the perforations $c$ in the concentrating-surface are directed from the discharge toward the feed end of the machine, more or less dust and like waste material will find its way through said perforations into the fluid-chamber B, and in order to keep such chamber properly cleaned I have provided said chamber near the discharge end of the machine with a dust-discharge T normally closed by a suitable valve or slide $t$, from which it will be seen that the chamber B may be readily freed from accumulations of dust and like waste material by merely opening the slide or valve $t$ and giving the machine a vibratory motion, or such material will fall from the dust-chute T without such assistance of motion to the machine.

The machine that I have herein described is especially adapted for transportation and can be made in any small size, so as to be readily packed in a suitable carrying-case by a single individual, if desired, although as to size the machine may of course vary between wide limits.

While I have shown the particular direction of the perforations in the concentrating-surface C and the particular construction and disposition of the riffles and impedimental bars and likewise other features of structure, it is to be understood that in these particulars the device may be varied between wide limits.

Material being fed into the feed-hopper H and the preferred form of regulating device L being adjusted in position, as shown in Fig. 1, with the machine held by the hands or otherwise in proper inclined position suitable to the material being acted upon, the said material will flow downward toward, onto, and across the concentrating-surface toward the discharge end of the machine and will be controlled in this movement toward the discharge end of the machine by the impedimental and regulating bars, so that its course through the machine will not be too rapid, and so that also the top layers of material may not travel through the machine over the lower layers without being first acted upon by the air or fluid currents to stratify the material and cause the heavier particles or values to be deposited upon the concentrating-surface in the pockets of the riffles. The material thus passing through the machine is acted upon by the air or fluid currents passing through the perforated concentrating-surface, which fluid-currents are directed across and over the concentrating-surface and then pass upward through the mass of material, thus assisting in the obstruction of the free downward movement of the material and stratifying the same by its agitation of the material, which causes the heavy particles to gravitate to the bottom of the mass. The concentrates or values will thus fall into pockets to the left of the riffles and may be collected therefrom through the concentrate-chute S, as desired.

Having thus described my invention, what I claim as new, and desire to secure by Letters Patent, is—

1. In a dry washer, the combination of a frame, a concentrating-surface arranged upon said frame, said concentrating-surface being provided with perforations, said perforations being disposed to direct currents of fluid over or parallel to the concentrating-surface against the flow of material thereon, a series of riffles extending across the frame and disposed above the concentrating-surface, and means for introducing a blast of fluid through said perforations.

2. In a dry washer, the combination of a box-like frame, provided with a perforated concentrating-surface arranged above the bottom thereof to form a fluid-chamber, means for introducing fluid-currents into said chamber, a series of riffles arranged transversely of and in contact with the concentrating-surface, a series of impedimental bars arranged above the concentrating-surface providing a space between said surfaces and their lower edges for the passage of material, and a series of regulating-bars disposed above the impedimental bars.

3. In a dry washer, the combination of a box-like frame, a concentrating-surface provided with perforations having offsets for directing fluid-currents over said surface, means for directing fluid-currents through said perforations, a series of riffles arranged above and in contact with said concentrating-surface, a series of impedimental bars having their lower edges disposed at a distance above the concentrating-surface, and a series of regulating-bars above the impedimental bars.

4. In a dry washer, the combination of a box-like frame having side pieces and a concentrating-surface arranged above the bottom of said frame to provide a fluid-chamber, said concentrating-surface being provided with perforations, means for introducing fluid into said fluid-chamber, a series of riffles extending between the side pieces of the box-like frame and having their lower edges in contact with the concentrating-surface, a series of impedimental bars extending between the side pieces of the box-like frame and having their lower edges disposed above the concentrating-surfaces, and a series of removable regulating-bars disposed above the impedimental bars.

5. In a dry washer, the combination of a box-like frame having a feed-hopper at one end and side pieces extending toward the discharge end thereof, a perforated concentrating-surface arranged above the bottom of said box-like frame to provide a fluid-chamber, means for introducing fluid-blasts into the fluid-chamber near the discharge end of the machine, a series of riffles extending between the side pieces of the frame and having their lower edges in contact with the concentrating-surface, the said side pieces being provided with perforations for the removal of values or concentrates caught by the riffles, a series of impedimental bars and regulating-bars arranged above the concentrating-surface and riffles.

6. In a dry washer, the combination of a frame having a feed-hopper at one end and discharge-opening at the other, side pieces extending between the feed-hopper and discharge end of the machine, a concentrating-surface arranged above the bottom of said frame to provide a fluid-chamber, said concentrating-surface having perforations provided with offsets for directing fluid-currents over said concentrating-surface in a direction toward the feed-hopper, means for introducing fluid-currents into the fluid-chamber at the discharge end of the machine, and a series of riffles, impedimental bars and regulating-bars disposed between the side pieces and the frame, substantially as described.

7. In a dry washer, the combination of a frame, a feed-hopper at one end thereof, and a discharge-opening at the opposite end, side pieces extending from the feed-hopper to the discharge end, a perforated concentrating-surface arranged above the bottom of the said frame, means for introducing fluid-currents into said fluid-chamber, a series of riffles extending between the side pieces of the frame and having their lower edges in contact with the concentrating-surface, and a series of impedimental bars disposed above the concentrating-surface, and a series of regulating-bars disposed above the impedimental bars, said regulating-bars having teeth projecting from their lower edges.

8. In a dry washer, the combination of a box-like frame having a feed-chute at one end and a discharge at the opposite end, side pieces extending from the feed-hopper to the discharge end, a perforated concentrating-surface arranged above the bottom of said box-like frame to form a fluid-chamber, means for introducing blasts of fluid into said fluid-chamber, a series of riffles inclined to and in contact with the concentrating-surface and extending between the said side pieces, a series of impedimental bars extending between the side pieces and disposed with their lower edges above the concentrating-surface, and a removable regulating device having regulating-bars extending between the side pieces, and teeth projecting from the lower edge of said regulating-bars.

9. In a machine of the class described, the combination of a frame, a concentrating-surface supported thereby, a feed-hopper disposed at one end of said frame to supply material to the concentrating-surface, said concentrating-surface being provided with perforations the walls of which are disposed to direct fluid-currents toward the hopper over or parallel to said surface to move the material along said surface and stratify the same, and means for directing currents of fluid through said perforations.

10. In a machine of the class described, the combination of a frame, a concentrating-surface supported thereby, a feed-hopper to supply material to said surface, said surface being provided with perforations disposed in a direction toward the feed-hopper to direct currents of fluid over said surface against the flow of material thereon, a series of riffles above the concentrating-surface, and means for directing fluid-currents through said perforations.

11. In a machine of the class described, the combination of a frame, a concentrating-surface supported thereby, a feed-hopper at one end of the machine to supply material to said surface for treatment, chutes disposed at the side of the machine for the discharge of the concentrates or values, a discharge for the waste products, said surface being provided with a series of perforations, the walls of which are disposed to direct currents of fluid over said surface and against the flow of material thereon, and means for directing fluid-currents through said perforations.

12. In a machine of the class described, the combination of a frame, a concentrating-surface supported thereby, a feed-hopper at one end of the machine to supply material to said surface for treatment, chutes disposed at the side of the machine for the discharge of the concentrates, or values, slides or doors for normally closing said chutes, a discharge for the waste products, said surface being provided with a series of perforations, the walls of which are disposed to direct currents of fluid over said surface and against the flow of material thereon, and means for directing fluid-currents through said perforations.

13. In a machine of the class described, the combination of a frame, a concentrating-surface supported thereby, a feed-hopper at one end of the machine to supply material to said surface for treatment, chutes disposed at the side of the machine for the discharge of the concentrates or values, a discharge for the waste products, a series of riffles disposed above said concentrate-surface, one adjacent each of said chutes, said surface being provided with a series of perforations, the walls of which are disposed to direct currents of fluid over said surface and against the flow of material thereon, and means for directing fluid-currents through said perforations.

ALBERT H. STEBBINS.

In presence of—
J. F. LEWIS,
J. E. LEAS.